(12) United States Patent
Li et al.

(10) Patent No.: US 12,002,198 B2
(45) Date of Patent: Jun. 4, 2024

(54) CHARACTER DEFECT DETECTION METHOD AND DEVICE

(71) Applicant: GOERTEK INC., Shandong (CN)

(72) Inventors: Shiyu Li, Shandong (CN); Yifan Zhang, Shandong (CN); Jifeng Tian, Shandong (CN)

(73) Assignee: GOERTEK INC., Shandong (CN)

( * ) Notice: Subject to any disclaimer, the term of this patent is extended or adjusted under 35 U.S.C. 154(b) by 428 days.

(21) Appl. No.: 17/594,142

(22) PCT Filed: Oct. 30, 2020

(86) PCT No.: PCT/CN2020/125318
§ 371 (c)(1),
(2) Date: Oct. 4, 2021

(87) PCT Pub. No.: WO2021/135605
PCT Pub. Date: Jul. 8, 2021

(65) Prior Publication Data
US 2022/0172337 A1 Jun. 2, 2022

(30) Foreign Application Priority Data

Dec. 30, 2019 (CN) .......................... 201911397495.5

(51) Int. Cl.
G06T 7/90 (2017.01)
G06T 3/02 (2024.01)
(Continued)

(52) U.S. Cl.
CPC ................ *G06T 7/001* (2013.01); *G06T 3/02* (2024.01); *G06T 7/90* (2017.01); *G06T 11/001* (2013.01);
(Continued)

(58) Field of Classification Search
CPC ............ G06T 7/90; G06T 3/02; G06T 11/001
See application file for complete search history.

(56) References Cited

U.S. PATENT DOCUMENTS 6,654,487 B1 * 11/2003 Downs, Jr. ............. G06V 10/98
382/213
6,756,589 B1 6/2004 Obara et al.
(Continued)

FOREIGN PATENT DOCUMENTS

| CN | 101221661 A | 7/2008 |
|---|---|---|
| CN | 101916445 A | 12/2010 |

(Continued)

OTHER PUBLICATIONS

Zhang Xin-You, Medical Image Processing, China Traditional Chinese Medicine Publishing House, Apr. 2015.

(Continued)

*Primary Examiner* — Sam Bhattacharya
(74) *Attorney, Agent, or Firm* — LKGlobal | Lorenz & Kopf, LLP (57) ABSTRACT

A character defect detection method and device are disclosed. The character defect detection method comprises: acquiring an image to be inspected containing a character and a template character image corresponding to the character, and converting the image to be inspected into an image having a format consistent with a format of the template character image; extracting a first valid area containing the character from the image to be inspected, and extracting a second valid area containing a template character from the template character image; obtaining a first image based on the first valid area, and obtaining a second image based on the second valid area; calculating a transformed image indicating an information difference between the first image and the second image based on the first image and the (Continued)

second image; and obtaining a character defect detection result of the image to be inspected based on information of the transformed image.

20 Claims, 5 Drawing Sheets

(51) Int. Cl.
    *G06T 7/00*           (2017.01)
    *G06T 11/00*         (2006.01)
    *G06V 30/14*         (2022.01)

(52) U.S. Cl.
    CPC ............... *G06V 30/1444* (2022.01); *G06T 2207/20056* (2013.01); *G06T 2207/30176* (2013.01)

(56) References Cited

U.S. PATENT DOCUMENTS

| | | |
|---|---|---|
| 2004/0057629 A1 | 3/2004 | Shikami et al. |
| 2007/0230819 A1 | 10/2007 | Shimizu |
| 2011/0058729 A1 | 3/2011 | Inoue et al. |
| 2012/0242824 A1 | 9/2012 | Takahashi et al. |

FOREIGN PATENT DOCUMENTS

| | | |
|---|---|---|
| CN | 101980289 A | 2/2011 |
| CN | 103226106 A | 7/2013 |
| CN | 103591904 A | 2/2014 |
| CN | 103828361 A | 5/2014 |
| CN | 104166848 A | 11/2014 |
| CN | 104568986 A | 4/2015 |
| CN | 105675626 A | 6/2016 |
| CN | 105894514 A | 8/2016 |
| CN | 105938547 A | 9/2016 |
| CN | 106803244 A | 6/2017 |
| CN | 106952257 A | 7/2017 |
| CN | 107247057 A | 10/2017 |
| CN | 107328793 A | 11/2017 |
| CN | 107421953 A | 12/2017 |
| CN | 107492091 A | 12/2017 |
| CN | 107561736 A | 1/2018 |
| CN | 108416765 A | 8/2018 |
| CN | 108918536 A | 11/2018 |
| CN | 108982508 A | 12/2018 |
| CN | 109142383 A | 1/2019 |
| CN | 109308700 A | 2/2019 |
| CN | 109598271 A | 4/2019 |
| CN | 109724990 A | 5/2019 |
| CN | 109934809 A | 6/2019 |
| CN | 110097046 A | 8/2019 |
| CN | 110111301 A | 8/2019 |
| CN | 110197180 A | 9/2019 |
| CN | 110390677 A | 10/2019 |
| CN | 110596121 A | 12/2019 |
| CN | 111060527 A | 4/2020 |
| JP | 1995121721 A | 5/1995 |
| JP | 1995144461 A | 6/1995 |
| JP | 1998063779 A | 3/1998 |
| JP | 1998096613 A | 4/1998 |
| JP | 2001043372 A | 2/2001 |
| JP | 2004109047 A | 4/2004 |
| JP | 2004276476 A | 10/2004 |
| JP | 2005208847 A | 8/2005 |
| JP | 2009097922 A | 5/2009 |
| JP | 2011076204 A | 4/2011 |
| JP | 2011138208 A | 7/2011 |

OTHER PUBLICATIONS

Li Xize, et al., Planar Image Processing, Wuhan University Press, Apr. 2015.

* cited by examiner

CHARACTER DEFECT DETECTION METHOD AND DEVICE

CROSS REFERENCE TO RELATED APPLICATIONS

This Application is a U.S. National Stage entry under 35 U.S.C. § 371 based on International Application No. PCT/CN2020/125318, filed on Oct. 30, 2020, which was published under PCT Article 21(2) and which claims priority to Chinese Patent Application No. 201911397495.5, filed on Dec. 30, 2019. These applications are hereby incorporated herein in their entirety by reference.

TECHNICAL FIELD

This Application pertains to the field of image technology, in particular to a character defect detection method and device.

BACKGROUND

Printing or laser engraving characters such as some product information (origin, product name, company trademark, etc.) on products is a way to customize the product appearance. However, the print heads of current printing equipment or laser engraving equipment generally have a certain error when printing characters, for example, the thickness of character strokes are not completely uniform, so the detection of these characters has become an important step in the production process. At present, most character defect detection is still performed manually, which is low in efficiency and high in labor costs. In addition, other objects, desirable features and characteristics will become apparent from the subsequent summary and detailed description, and the appended claims, taken in conjunction with the accompanying drawings and this background.

SUMMARY

In view of the above problems, the present disclosure is proposed to provide a character defect detection method and device that can overcome or at least partially solve the above problems.

According to an aspect of the present disclosure, a character defect detection method is provided. The character defect detection method comprises:
  acquiring an image to be inspected containing a character and a template character image corresponding to the character, and converting the image to be inspected into an image having a format consistent with a format of the template character image;
  extracting a first valid area containing the character from the image to be inspected, and extracting a second valid area containing a template character from the template character image;
  obtaining a first image based on the first valid area, and obtaining a second image based on the second valid area;
  calculating a transformed image indicating an information difference between the first image and the second image based on the first image and the second image; and
  obtaining a character defect detection result of the image to be inspected based on information of the transformed image.

According to another aspect of the present disclosure, a character defect detection device is provided. The character defect detection device comprises:
  an acquisition module for acquiring an image to be inspected containing a character and a template character image corresponding to the character, and converting the image to be inspected into an image having a format consistent with a format of the template character image;
  an extraction module for extracting a first valid area containing the character from the image to be inspected, and extracting a second valid area containing a template character from the template character image;
  a determining module for obtaining a first image based on the first valid area, and obtaining a second image based on the second valid area;
  a transformation module for calculating a transformed image indicating an information difference between the first image and the second image based on the first image and the second image; and
  a detection module for obtaining a character defect detection result of the image to be inspected based on information of the transformed image.

According to still another aspect of the present disclosure, a computer readable storage medium is provided. The computer readable storage medium stores a computer program, and the computer program causes a computer to execute the above method.

The technical solutions of character defect detection according to the embodiments of the present disclosure uses the transformed image containing the information difference between the first image and the second image, and can accurately obtain the difference between the two images according to the transformed image and determine abnormal points, and thus realize character defect detection, which ensures that the detection accuracy of the embodiments of the present disclosure is comparable to the accuracy of manual detection. Moreover, when the character defect detection method or device according to the embodiments of the present disclosure are run, the character defect detection of the image to be inspected is automatically realized, the effect of automation is achieved, and the labor costs are reduced, so they are suitable for large-scale promotion.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Hereinafter, exemplary embodiments of the present disclosure will be described in more detail with reference to the drawings. Although the drawings show the exemplary embodiments of the present disclosure, it should be understood that the present disclosure can be implemented in various ways and should not be limited by the embodiments disclosed herein. On the contrary, the embodiments are provided for a more thorough and complete understanding of the present disclosure, so as to fully convey the scope of the present disclosure to those skilled in the art.

Figure 1:
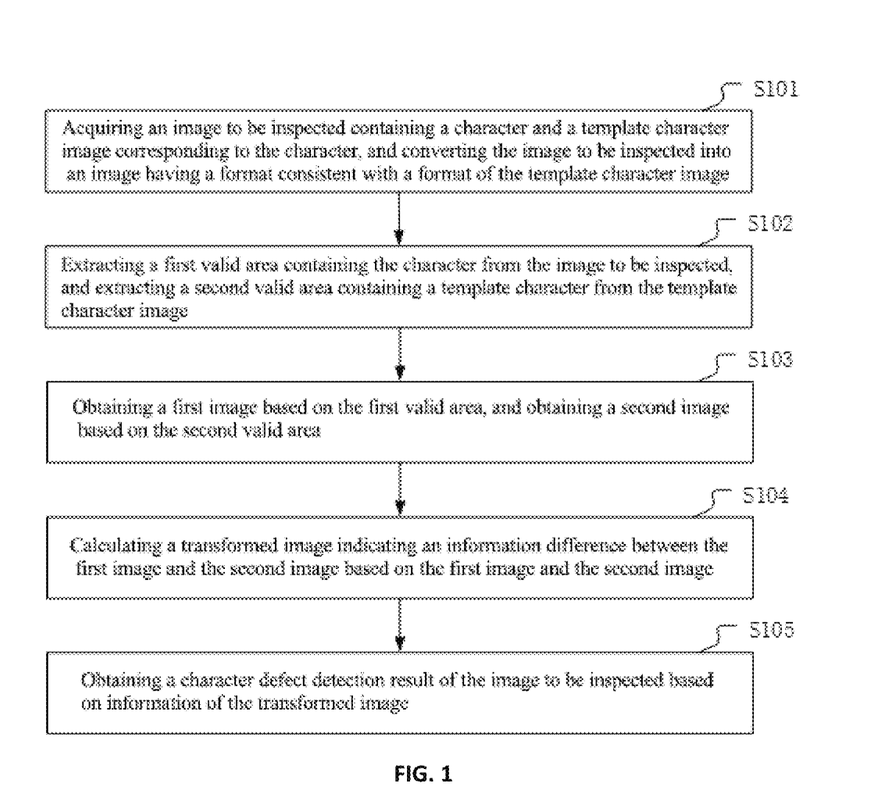
FIG. 1 is a schematic flowchart of a character defect detection method according to an embodiment of the present disclosure.

FIG. 1 is a schematic flowchart of a character defect detection method according to an embodiment of the present disclosure. Referring to FIG. 1, the character defect detection method in the present embodiment comprises the following steps:

step S101, acquiring an image to be inspected containing a character and a template character image corresponding to the character, and converting the image to be inspected into an image having a format consistent with a format of the template character image;

The character herein includes symbol information such as an alphabet letter, number, Chinese character or bar code.

step S102, extracting a first valid area containing the character from the image to be inspected, and extracting a second valid area containing a template character from the template character image;

step S103, obtaining a first image based on the first valid area, and obtaining a second image based on the second valid area;

step S104, calculating a transformed image indicating an information difference between the first image and the second image based on the first image and the second image; and step S105: obtaining a character defect detection result of the image to be inspected based on information of the transformed image.

It can be seen from FIG. 1 that the present embodiment accurately obtains the difference between the two images according to the transformed image, and then completes the character defect detection of the image to be inspected, thereby ensuring the detection accuracy. Moreover, when the method according to the present embodiment is run, the character defect detection of the image to be inspected is automatically realized, which achieves an effect of automation and reduces labor costs.

The character defect detection according to the embodiments of the present disclosure is applicable to many application scenarios such as laser engraving and printing, and the implementation process is basically the same. Therefore, the above character defect detection method will be described below by taking laser engraving of characters as an example.

Laser engraving is a processing manner that uses a laser beam to engrave characters on the surface of a material or inside a transparent material. The characters can be customized according to needs. FIG. 2 to FIG. 10 schematically illustrate various related images in a character defect detection process. The implementation steps of the character defect detection according to the present embodiment will be specifically described with reference to FIG. 2 to FIG. 10.

First, images are acquired and binarized.

Figure 2:
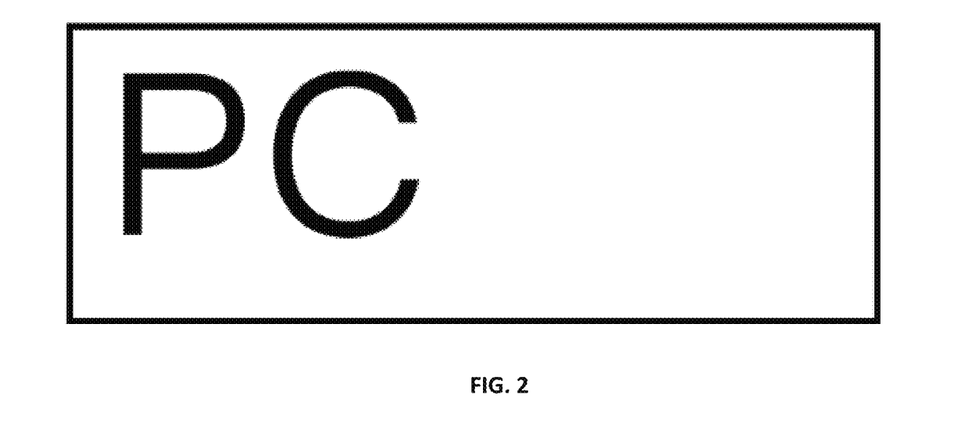
FIG. 2 is a schematic diagram of a template character image according to an embodiment of the present disclosure.
Figure 3:
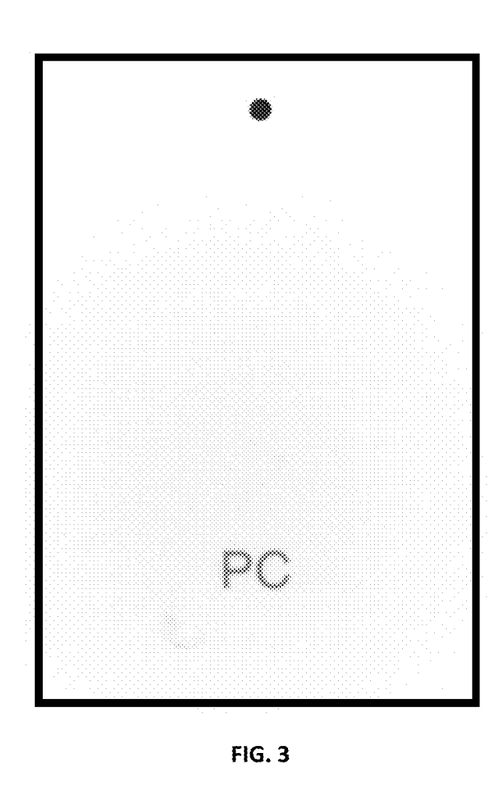
FIG. 3 is a schematic diagram of an image to be inspected according to an embodiment of the present disclosure.

In the present embodiment, an image to be inspected containing a character and a template character image corresponding to the character are acquired, and the image to be inspected is converted into an image having a format consistent with the format of the template character image. FIG. 2 is a schematic diagram of a template character image according to an embodiment of the present disclosure, and FIG. 3 is a schematic diagram of an image to be inspected according to an embodiment of the present disclosure. Referring to FIG. 2, the template character image is a binary image. Thus, in the present embodiment, the image to be inspected is converted into a binary image to ensure that the formats of the two images are consistent.

In practical applications, if the image to be inspected is not a grayscale image, the image to be inspected can be processed first to remain only the grayscale information, and the grayscale image is used for detection, which will not affect the detection effect but can save the detection time. In the present embodiment, the grayscale image is further simplified, and a binary image is used. If the template character image is not a black and white image, the binarization process should be performed first to set the gray values of the pixel points on the template character image to 0 or 255, and convert the template character image to a black and white image. It should be noted that, in the binarization process, the gray values of the pixel points corresponding to the character in the template character image is set to the sum of 0 and the preset gray value. The preset gray value can be determined according to the average normal gray value of the good products. The reason why the gray value of the pixel points of the character is not directly set to 0 but set to the sum of 0 and the preset gray value is to make the gray values of the template character image and the image to be inspected to be as close as possible so as to ensure the effect of subsequent image registration and character defect detection.

Second, valid areas are extracted.

A first valid area containing the character is extracted from the image to be inspected. For example, a circular or polygonal area containing the character is extracted from the image to be inspected as the first valid area. A second valid area containing a template character is extracted from the template character image. For example, a circular or polygonal area containing the template character is extracted from the template character image as the second valid area.

Figure 4:
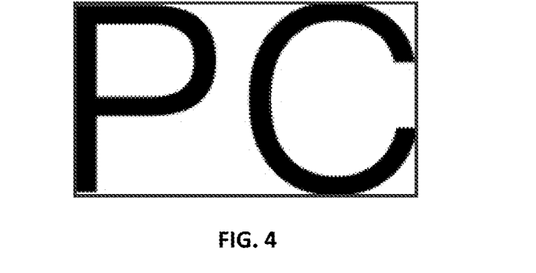
FIG. 4 is a schematic diagram of a second valid area of a template character image according to an embodiment of the present disclosure.
Figure 5:
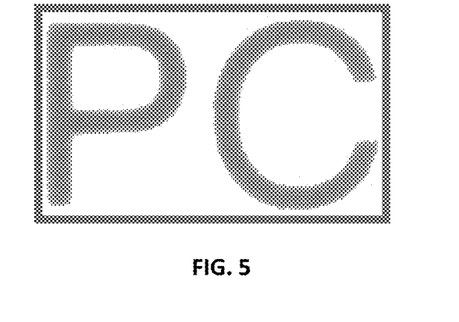
FIG. 5 is a schematic diagram of a first valid area of an image to be inspected according to an embodiment of the present disclosure.

For the convenience of processing, in the present embodiment, the smallest circumscribed rectangular area of the template character in the template character image is extracted to obtain the second valid area. The second valid area obtained after extraction is shown in FIG. 4, and the rectangular frame (the second valid area) in FIG. 4 is the smallest circumscribed rectangle that contains the character "PC". The smallest circumscribed rectangular area of the character in the image to be inspected is extracted to obtain the first valid area, and the first valid area obtained after extraction is shown in FIG. 5.

Please note that the order of the above steps of binarizing the image and extracting the valid area is not limited. It is possible to extract the valid area first and then binarize the valid area, or binarize the image first and then extract the valid area. The effects are the same.

Third, superimposition is performed to generate images.

Figure 6:
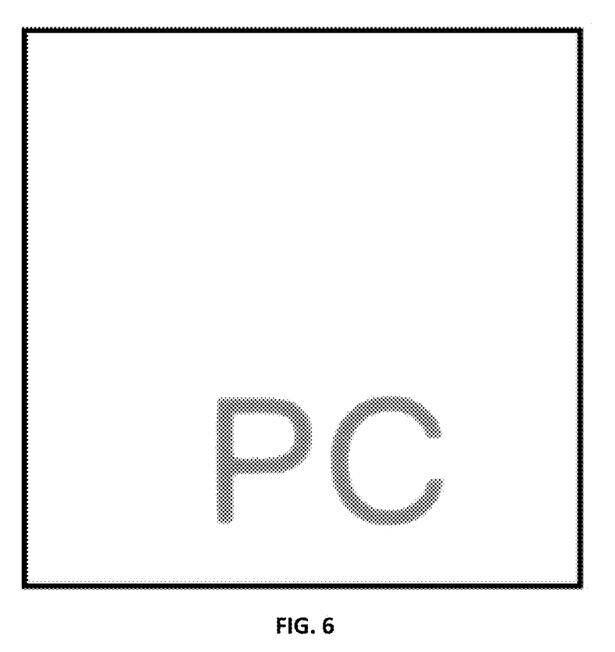
FIG. 6 is a schematic diagram of a first image according to an embodiment of the present disclosure.
Figure 7:
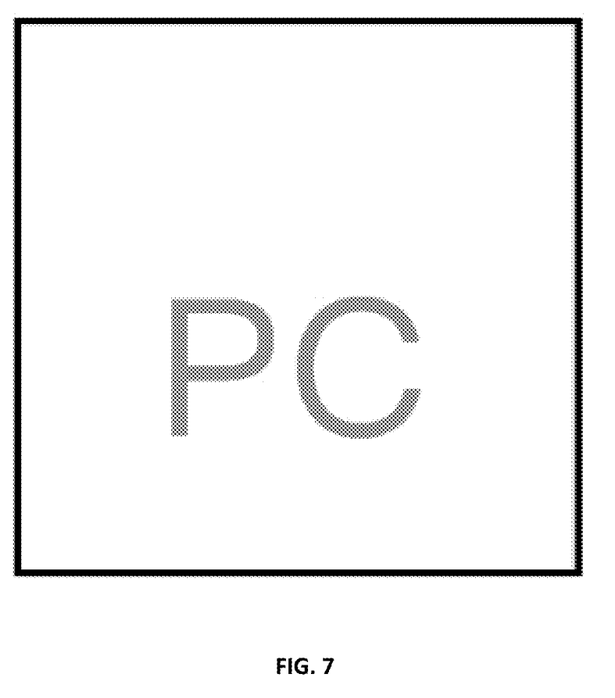
FIG. 7 is a schematic diagram of a second image according to an embodiment of the present disclosure.

In the present embodiment, after the first valid area and the second valid area are extracted, the step of generating the first image and the second image is performed. In other words, obtaining a first image based on the first valid area, and obtaining a second image based on the second valid area comprises: selecting a background color picture based on the second valid area and a size determined by a Fourier transform result of the template character image; superimposing the first valid area on the background color picture to obtain the first image; and superimposing the second valid area on the background color picture to obtain the second image. The first image obtained here is shown in FIG. 6, and the second image obtained is shown in FIG. 7. It should be noted that, in the present embodiment, when performing image superimposition, in the horizontal direction, the template character or the character of the image to be inspected should be in the center position of their corresponding white background pictures respectively; in the vertical direction, the template character or the character of the image to be inspected can position approximately close in their corresponding white background pictures respectively, in other words, in the vertical direction, the template characters and the character of the image to be inspected may be located within the same position range in the corresponding background color pictures respectively. Since the character size of the template character image and the character size of the image to be inspected are originally different, it cannot be guaranteed that the positions of them are exactly the same when superimposed on a white background image of the same size.

In addition, it can be seen that the white image is selected as the background color picture in the present embodiment, but it should be noted that the present embodiment is not limited to this. The background color picture may also be a black image. Accordingly, when a black image is selected as the background color picture, the area where the character is located may be processed to be white first.

Since no character is laser engraved on the edges of a casing, the circumscribed rectangle of the template character in the template character image can be calculated to obtain the width and height of the second valid area, and the width and height of the white background image are determined according to the width and height of the second valid area and the result of Fourier transform performed on the template character image, thereby speeding up the subsequent Fourier transform process of the template character image and saving detection time.

For example, the width and height of the second valid area are (50, 50) respectively, and the Fourier transform is based on a binary recursion. The number of pixel points needed is a power of 2. Here some points (generally, of a value of 0) can be added to make up a power of 2. For example, according to the required width and height, the width and height are both added by 14 points so as to make up 2 to the 6th power (64), thereby facilitating the subsequent Fourier transform on the template character image. Based on this, an alternative choice of the width and height of the white background image in the present embodiment is that the width and height are (64, 64).

Fourth, image transformation is performed to obtain a transformed image.

After acquiring the first image and the second image, image registration is performed. In the present embodiment, calculating a transformed image indicating an information difference between the first image and the second image based on the first image and the second image comprises: calculating a displacement offset between the first image and the second image; calculating a Fourier transform result image according to the first image or the second image in combination with the displacement offset; performing spatial transformation according to the Fourier transform result image, the first image and the second image to obtain the transformed image.

Further, the present embodiment comprises: performing color inversion processing on the first image and the second image; performing Fourier transform on the second image after color inverted to obtain a displacement offset between the first image after color inverted and the second image after color inverted, and reversely moving the second image after color inverted according to the displacement offset to obtain the Fourier transform result image; constructing respectively a polar coordinate system of the first image after color inverted and a polar coordinate system of the Fourier transform result image, and determining a displacement between the first image after color inverted and the Fourier transform result image according to polar coordinates of pixel points of the first image after color inverted and polar coordinates of pixel points of the Fourier transform result image; and determining an affine transformation parameter according to the displacement, and performing affine transformation on the second image based on the affine transformation parameter to obtain the transformed image.

Figure 8:
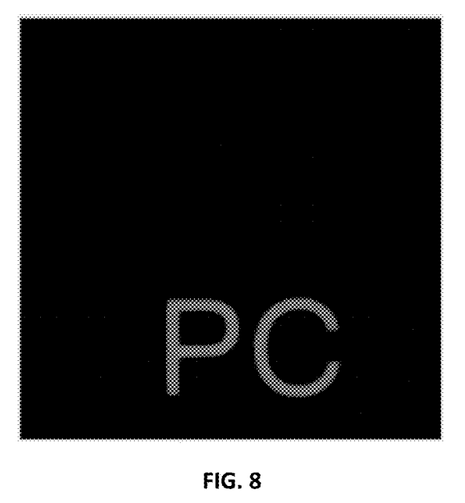
FIG. 8 is a schematic diagram of a first image after color inverted according to an embodiment of the present disclosure.

Following the above example, FIG. 6 is a schematic diagram of a first image according to an embodiment of the present disclosure, and FIG. 7 is a schematic diagram of a second image according to an embodiment of the present disclosure. The color inversion processing is perform on the first image shown in FIG. 6, and the first image after color inverted is obtained, as shown in FIG. 8. The color inversion processing is performed on the second image shown in FIG. 7, and the second image after color inverted is obtained. Then, the inverse Fourier transform is performed on the image shown in FIG. 8 and the second image after color inverted using the phase correlation method to obtain an impulse function, and the peak value of the impulse function is calculated. The coordinates at the peak value are the displacement offset between the image shown in FIG. 8 and the second image after color inverted. The second image after color inverted is reversely moved according to the displacement offset to obtain the Fourier transform result image. Then, a polar coordinate system is constructed with the center point of the image shown in FIG. 8 as the center, and a polar coordinate system is constructed with the center point of the Fourier transform result image as the center, respectively, to obtain the polar coordinates of each pixel point in the image shown in FIG. 8, and the polar coordinates of each pixel point of the Fourier transform result image.

Figure 9:
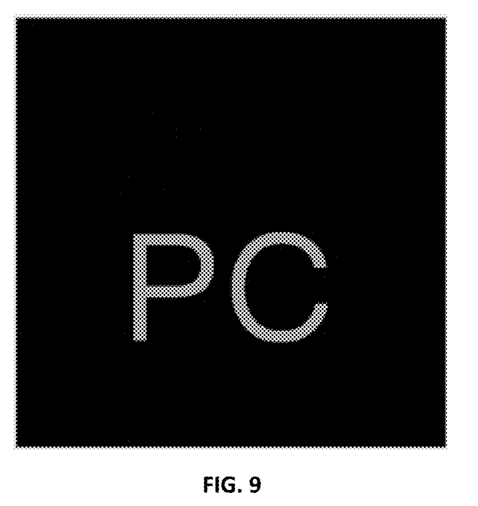
FIG. 9 is a schematic diagram of a transformed image according to an embodiment of the present disclosure.
Figure 10:
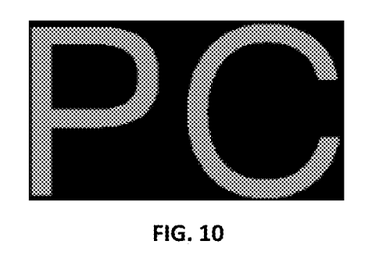
FIG. 10 is a partial enlarged view of a transformed image according to an embodiment of the present disclosure.

After obtaining the polar coordinates, the offset between the image shown in FIG. 8 and the Fourier transform result image is rotation and scaling. Then the rotation angle and scaling factor of the image shown in FIG. 8 and the Fourier transform result image are detected using the phase correlation method. An affine transformation value is obtained according to the rotation angle and the scaling factor, and the Fourier transformation result image is subjected to affine transformation. The Fourier transformation result image after transformed is shown in FIG. 9, and the partial enlargement details are shown in FIG. 10. So far, in the present embodiment, the spatial transformation is performed based on the template character image and the first image, and a transformed image is obtained.

The transformed image herein can be understood as an image obtained by converting the template character image into an image under the standard of the image to be inspected according to the correspondence between the template character image and the image to be inspected. Similarly, in other embodiments of the present disclosure, the image to be inspected can be converted to an image under the standard of the template character image according to the correspondence between the template character image and the image to be inspected to obtain a transformed image, and then the character defect detection of the image to be inspected is completed according to the information of the transformed image. Since the template character image is generally a regular, clear, and less noisy image, it is preferable to convert the template character image to the standard of the image to be inspected according to the correspondence between the template character image and the image to be inspected to obtain a transformed image.

Finally, character defects are detected.

After the transformed image is obtained, in the present embodiment, for example, obtaining a character defect detection result of the image to be inspected based on information of the transformed image comprises: detecting whether the character in the image to be inspected has a stain or character content error according to mask information of a character area in the transformed image; and/or, detecting whether the character in the image to be inspected has a character color darkness defect according to gray value information of a character area in the transformed image. That is to say, in an embodiment, it is possible to detect whether the character in the image to be inspected has a stain or character content error according to the mask information of the character area in the transformed image. In another embodiment, it is possible to detect whether the character in the image to be inspected has a stain or character content error according to the mask information of the character area in the transformed image, and to detect whether the character in the image to be inspected has a character color darkness defect according to the gray value information of the character area in the transformed image. In another embodiment, it is possible to detect whether the character in the image to be inspected has a character color darkness defect according to the gray value information of the character area in the transformed image.

Specifically, detecting whether the character in the image to be inspected has a character color darkness defect according to gray value information of a character area in the transformed image comprises: setting a normal gray value range, and selecting pixel points whose gray value belongs to the normal gray value range from the transformed image to form a target pixel area; and calculating an area of the target pixel area, and determining that the character in the image to be inspected has a character color darkness defect when the area of the target pixel area is inconsistent with a preset area threshold.

For example, a normal gray value range M is set, and pixel points whose gray value belongs to the normal gray value range M are selected from the transformed image shown in FIG. 9, and these pixel points form a target pixel area. The area of the target pixel area is calculated. When the area of the target pixel area is inconsistent with a preset area threshold, for example, when it is greater than the preset area threshold (the area threshold may be the minimum area that must be detected), it is determined that there is a character color darkness defect.

Detecting whether the character in the image to be inspected has a stain or character content error according to mask information of a character area in the transformed image comprises: calculating a mask of the character area in the transformed image; setting the character area of the first image to a color indicated by a background color according to the mask, and obtaining a size of an area of the first image whose color is not a background color; and determining that the character in the image to be inspected has a stain or character content error when the size of the area of the first image whose color is not a background color is greater than a preset threshold.

For example, the mask of the character area in the transformed image shown in FIG. 9 is calculated, and the character area of the first image (image shown in FIG. 6) is set to a color indicated by a background color (such as white) using the mask. That is to say, the character area is set to white, and then the size of the dirty area (i.e., the non-white area) is calculated. When the size of the dirty area is greater than a preset threshold, it is determined that there is a stain.

It should be noted that, this method for judging whether the character area has a stain can also be used to determine whether there is a character content error. For example, the template character is "PC", but the character laser engraved on the product is "PD". As the letter C is different from the letter D, the part of the letter D that is more than the letter C is a stain, so the character content error laser engraved on the product is detected. In addition, in the present embodiment, alternatively, the peak value of the impulse function calculated in the process of obtaining the transformed image can be compared with a preset peak value threshold, and when the peak value is less than the preset peak value threshold, it indicates that the character contents have a low matching degree, namely, the laser engraved character has a content error.

It can be seen from the above that, the character defect detection method in the present embodiment automatically detects character defects of the image to be inspected, such as dark color, light color, stains, content errors and other defects, and ensures the detection accuracy. Moreover, it can be repeated on a large scale, and labor costs are reduced.

Figure 11:
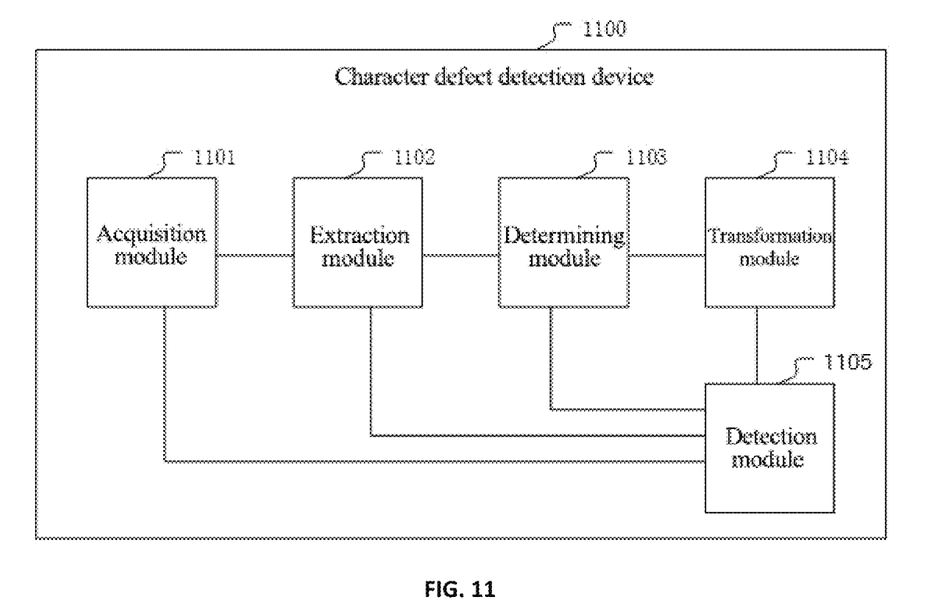
FIG. 11 is a block diagram of a character defect detection device according to an embodiment of the present disclosure.

FIG. 11 is a block diagram of a character defect detection device according to an embodiment of the present disclosure. Referring to FIG. 11, the character defect detection device in the present embodiment comprises:

an acquisition module 1101 for acquiring an image to be inspected containing a character and a template character image corresponding to the character, and converting the image to be inspected into an image having a format consistent with a format of the template character image;

an extraction module 1102 for extracting a first valid area containing the character from the image to be inspected, and extracting a second valid area containing a template character from the template character image;

a determining module 1103 for obtaining a first image based on the first valid area, and obtaining a second image based on the second valid area;

a transformation module 1104 for calculating a transformed image indicating an information difference between the first image and the second image based on the first image and the second image; and a detection module 1105 for obtaining a character defect detection result of the image to be inspected based on information of the transformed image.

In an embodiment of the present disclosure, the detection module 1105 is specifically for detecting whether the character in the image to be inspected has a stain or character content error according to mask information of a character area in the transformed image; and/or, detecting whether the character in the image to be inspected has a character color darkness defect according to gray value information of a character area in the transformed image.

In an embodiment of the present disclosure, the extraction module 1102 is specifically for extracting a circular or polygonal area containing the character in the image to be inspected as the first valid area; and extracting a circular or polygonal area containing the template character in the template character image as the second valid area.

In an embodiment of the present disclosure, the determining module 1103 is specifically for selecting a background color picture based on the second valid area and a size determined by a Fourier transform result of the template character image; superimposing the first valid area on the background color picture to obtain the first image; and superimposing the second valid area on the background color picture to obtain the second image.

In an embodiment of the present disclosure, the template character image is a binary image, the image to be inspected is converted into a binary image, and a white image is selected as the background color picture.

In an embodiment of the present disclosure, the transformation module 1104 is specifically for calculating a displacement offset between the first image and the second image; calculating a Fourier transform result image according to the first image or the second image in combination with the displacement offset; and performing spatial transformation according to the Fourier transform result image, the first image and the second image to obtain the transformed image.

In an embodiment of the present disclosure, the transformation module 1104 is specifically for performing color inversion processing on the first image and the second image; performing Fourier transform on the second image after color inverted to obtain a displacement offset between the first image after color inverted and the second image after color inverted, and reversely moving the second image after color inverted according to the displacement offset to obtain the Fourier transform result image; constructing respectively a polar coordinate system of the first image after color inverted and a polar coordinate system of the Fourier transform result image, and determining a displacement between the first image after color inverted and the Fourier transform result image according to polar coordinates of pixel points of the first image after color inverted and polar coordinates of pixel points of the Fourier transform result image; and determining an affine transformation parameter according to the displacement, and performing affine transformation on the second image based on the affine transformation parameter to obtain the transformed image.

In an embodiment of the present disclosure, the detection module 1105 is specifically for setting a normal gray value range, and selecting pixel points whose gray value belongs to the normal gray value range from the transformed image to form a target pixel area; and calculating an area of the target pixel area, and determining that the character in the image to be inspected has a character color darkness defect when the area of the target pixel area is inconsistent with a preset area threshold.

In an embodiment of the present disclosure, the detection module 1105 is specifically for calculating a mask of the character area in the transformed image; setting the character area of the first image to a color indicated by a background color according to the mask, and obtaining a size of an area of the first image whose color is not a background color; and determining that the character in the image to be inspected has a stain or character content error when the size of the area of the first image whose color is not a background color is greater than a preset threshold.

It should be noted that the specific implementation details of the above character defect detection device embodiments may refer to the specific implementation details of the foregoing corresponding method embodiments, which will not be repeated herein.

Figure 12:
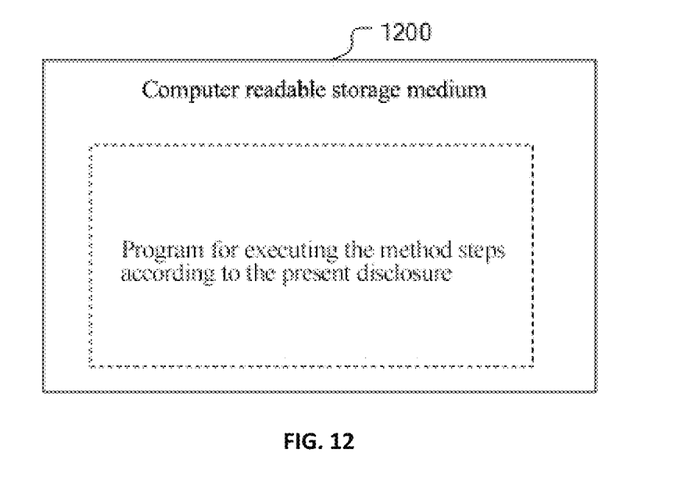
FIG. 12 is a schematic diagram of the structure of a computer readable storage medium according to an embodiment of the present disclosure.

Referring to FIG. 12, another embodiment of the present disclosure provides a computer readable storage medium 1200 that stores a computer program, and the computer program causes a computer to execute the foregoing method.

Specifically, the computer program stored in the computer readable storage medium 1200 causes the computer to execute the following method:

acquiring an image to be inspected containing a character and a template character image corresponding to the character, and converting the image to be inspected into an image having a format consistent with a format of the template character image; extracting a first valid area containing the character from the image to be inspected, and extracting a second valid area containing a template character from the template character image; obtaining a first image based on the first valid area, and obtaining a second image based on the second valid area; calculating a transformed image indicating an information difference between the first image and the second image based on the first image and the second image; and obtaining a character defect detection result of the image to be inspected based on information of the transformed image.

The computer program further causes the computer to execute the following method:

detecting whether the character in the image to be inspected has a stain or character content error according to mask information of a character area in the transformed image; and/or, detecting whether the character in the image to be inspected has a character color darkness defect according to gray value information of a character area in the transformed image.

The computer program further causes the computer to execute the following method:

calculating a displacement offset between the first image and the second image; calculating a Fourier transform result image according to the first image or the second image and the displacement offset; performing spatial transformation according to the Fourier transform result image, the first image and the second image to obtain the transformed image.

The computer program further causes the computer to execute the following method:

performing color inversion processing on the first image and the second image; performing Fourier transform on the second image after color inverted to obtain a displacement offset between the first image after color inverted and the second image after color inverted, and reversely moving the second image after color inverted according to the displacement offset to obtain the Fourier transform result image; constructing respectively a polar coordinate system of the first image after color inverted and a polar coordinate system of the Fourier transform result image, and determining a displacement between the first image after color inverted and the Fourier transform result image according to polar coordinates of pixel points of the first image after color inverted and polar coordinates of pixel points of the Fourier transform result image; determining an affine transformation parameter according to the displacement, and performing affine transformation on the second image based on the affine transformation parameter to obtain the transformed image.

The computer program further causes the computer to execute the following method:

calculating a mask of the character area in the transformed image; setting the character area of the first image to a color indicated by a background color according to the mask, and obtaining a size of an area of the first image whose color is not a background color; and determining that the character in the image to be inspected has a stain or character content error when the size of the area of the first image whose color is not a background color is greater than a preset threshold.

It should be noted that the specific implementable functions of the above computer readable storage medium embodiments may refer to the specific details of the foregoing corresponding method embodiments, which will not be repeated herein.

A person skilled in the art should understand that the embodiments of the present disclosure may be provided as a method, a system, or a computer program product. Thus, the present disclosure may take the form of an entirely hardware embodiment, an entirely software embodiment, or an embodiment combining software and hardware. Furthermore, the present disclosure may take the form of a computer program product embodied on one or more computer-usable storage media (including, but not limited to, disk storage, CD-ROMs, optical memories, etc.) having computer-usable program code recorded thereon.

The present disclosure is described with reference to flowcharts and/or block diagrams of the method, the device (system), and the computer program product according to the embodiment of the present disclosure. It should be understood that each flow and/or block in the flowcharts and/or block diagrams, and combinations of the flows and/or blocks in the flowcharts and/or block diagrams may be implemented by computer program instructions. The computer program instructions may be provided to a processor of a general purpose computer, a special purpose computer, an embedded processor, or other programmable data processing device to generate a machine so that a machine for implementing the functions specified in one or more flows of a flowchart or and/or one or more blocks of a block diagram can be generated by instructions executed by a processor of a computer or other programmable data processing device.

It should be noted that the terms "comprise", "include" or any other variations thereof are non-exclusive or open-ended, so that a process, method, article, or device including a series of elements includes not only those elements listed but also includes unspecified elements as well as elements that are inherent to such a process, method, article, or device. In the case that there is no more limitation, the phrase "comprising a . . . " does not exclude that the process, method, article, or device including the named element further includes additional named element.

The above are only specific embodiments of the present disclosure. Based on the above teaching of the present disclosure, those skilled in the art can make other improvements or modifications based on the above embodiments. Those skilled in the art should understand that the detailed description above is only for the purpose of better explaining the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A character defect detection method, comprising:
   acquiring an image to be inspected containing a character and a template character image corresponding to the character, and converting the image to be inspected into an image having a format consistent with a format of the template character image;
   extracting a first valid area containing the character from the image to be inspected, and extracting a second valid area containing a template character from the template character image;
   obtaining a first image based on the first valid area, and obtaining a second image based on the second valid area;
   calculating a transformed image indicating an information difference between the first image and the second image based on the first image and the second image; and
   obtaining a character defect detection result of the image to be inspected based on information of the transformed image.

2. The method according to claim 1, wherein obtaining a character defect detection result of the image to be inspected based on information of the transformed image comprises:
   detecting whether the character in the image to be inspected has a stain or character content error according to mask information of a character area in the transformed image; and/or,
   detecting whether the character in the image to be inspected has a character color darkness defect according to gray value information of a character area in the transformed image.

3. The method according to claim 1, wherein
   extracting a first valid area containing the character from the image to be inspected comprises: extracting a circular or polygonal area containing the character from the image to be inspected as the first valid area;
   extracting a second valid area containing a template character from the template character image comprises:

extracting a circular or polygonal area containing the template character from the template character image as the second valid area.

4. The method according to claim 1, wherein obtaining a first image based on the first valid area, and obtaining a second image based on the second valid area comprises:
selecting a background color picture based on the second valid area and a size determined by a Fourier transform result of the template character image;
superimposing the first valid area on the background color picture to obtain the first image; and
superimposing the second valid area on the background color picture to obtain the second image.

5. The method according to claim 4, wherein the template character image is a binary image, and the image to be inspected is converted into a binary image, and
the method further comprises:
selecting a white image as the background color picture.

6. The method according to claim 1, wherein calculating a transformed image indicating an information difference between the first image and the second image based on the first image and the second image comprises:
calculating a displacement offset between the first image and the second image;
calculating a Fourier transform result image according to the first image or the second image and the displacement offset; and
performing spatial transformation according to the Fourier transform result image, the first image and the second image to obtain the transformed image.

7. The method according to claim 6, further comprising:
performing color inversion processing on the first image and the second image;
performing Fourier transform on the second image after color inverted to obtain a displacement offset between the first image after color inverted and the second image after color inverted, and reversely moving the second image after color inverted according to the displacement offset to obtain the Fourier transform result image;
constructing respectively a polar coordinate system of the first image after color inverted and a polar coordinate system of the Fourier transform result image, and determining a displacement between the first image after color inverted and the Fourier transform result image according to polar coordinates of pixel points of the first image after color inverted and polar coordinates of pixel points of the Fourier transform result image; and
determining an affine transformation parameter according to the displacement, and performing affine transformation on the second image based on the affine transformation parameter to obtain the transformed image.

8. The method according to claim 2, wherein detecting whether the character in the image to be inspected has a character color darkness defect according to gray value information of a character area in the transformed image comprises:
setting a normal gray value range, and selecting pixel points whose gray value belongs to the normal gray value range from the transformed image to form a target pixel area; and
calculating an area of the target pixel area, and determining that the character in the image to be inspected has a character color darkness defect when the area of the target pixel area is inconsistent with a preset area threshold.

9. The method according to claim 2, wherein detecting whether the character in the image to be inspected has a stain or character content error according to mask information of a character area in the transformed image comprises:
calculating a mask of the character area in the transformed image;
setting the character area of the first image to a color indicated by a background color according to the mask, and obtaining a size of an area of the first image whose color is not the background color; and
determining that the character in the image to be inspected has a stain or character content error when the size of the area of the first image whose color is not the background color is greater than a preset threshold.

10. A character defect detection device, comprising:
an acquisition module for acquiring an image to be inspected containing a character and a template character image corresponding to the character, and converting the image to be inspected into an image having a format consistent with a format of the template character image;
an extraction module for extracting a first valid area containing the character from the image to be inspected, and extracting a second valid area containing a template character from the template character image;
a determining module for obtaining a first image based on the first valid area, and obtaining a second image based on the second valid area;
a transformation module for calculating a transformed image indicating an information difference between the first image and the second image based on the first image and the second image; and
a detection module for obtaining a character defect detection result of the image to be inspected based on information of the transformed image.

11. The device according to claim 10, wherein the detection module is specifically for detecting whether the character in the image to be inspected has a stain or character content error according to mask information of a character area in the transformed image; and/or,
detecting whether the character in the image to be inspected has a character color darkness defect according to gray value information of a character area in the transformed image.

12. The device according to claim 10, wherein the determining module is specifically for selecting a background color picture based on the second valid area and a size determined by a Fourier transform result of the template character image;
superimposing the first valid area on the background color picture to obtain the first image; and
superimposing the second valid area on the background color picture to obtain the second image.

13. The device according to claim 10, wherein the transformation module is specifically for calculating a displacement offset between the first image and the second image;
calculating a Fourier transform result image according to the first image or the second image and the displacement offset; and
performing spatial transformation according to the Fourier transform result image, the first image and the second image to obtain the transformed image.

14. The device according to claim 10, wherein the transformation module is specifically for
performing color inversion processing on the first image and the second image;

performing Fourier transform on the second image after color inverted to obtain a displacement offset between the first image after color inverted and the second image after color inverted, and reversely moving the second image after color inverted according to the displacement offset to obtain the Fourier transform result image;

constructing respectively a polar coordinate system of the first image after color inverted and a polar coordinate system of the Fourier transform result image, and determining a displacement between the first image after color inverted and the Fourier transform result image according to polar coordinates of pixel points of the first image after color inverted and polar coordinates of pixel points of the Fourier transform result image; and determining an affine transformation parameter according to the displacement, and performing affine transformation on the second image based on the affine transformation parameter to obtain the transformed image.

15. The device according to claim 11, wherein the detection module is specifically for calculating a mask of the character area in the transformed image;

setting the character area of the first image to a color indicated by a background color according to the mask, and obtaining a size of an area of the first image whose color is not the background color; and determining that the character in the image to be inspected has a stain or character content error when the size of the area of the first image whose color is not the background color is greater than a preset threshold.

16. A computer readable storage medium storing a computer program, wherein the computer program causes a computer to execute the following method:

acquiring an image to be inspected containing a character and a template character image corresponding to the character, and converting the image to be inspected into an image having a format consistent with a format of the template character image;

extracting a first valid area containing the character from the image to be inspected, and extracting a second valid area containing a template character from the template character image;

obtaining a first image based on the first valid area, and obtaining a second image based on the second valid area;

calculating a transformed image indicating an information difference between the first image and the second image based on the first image and the second image; and obtaining a character defect detection result of the image to be inspected based on information of the transformed image.

17. The computer readable storage medium according to claim 16, wherein the computer program further causes the computer to execute the following method:

detecting whether the character in the image to be inspected has a stain or character content error according to mask information of a character area in the transformed image; and/or, detecting whether the character in the image to be inspected has a character color darkness defect according to gray value information of a character area in the transformed image.

18. The computer readable storage medium according to claim 16, wherein the computer program further causes the computer to execute the following method:

calculating a displacement offset between the first image and the second image;

calculating a Fourier transform result image according to the first image or the second image and the displacement offset;

performing spatial transformation according to the Fourier transform result image, the first image and the second image to obtain the transformed image.

19. The computer readable storage medium according to claim 16, wherein the computer program further causes the computer to execute the following method:

performing color inversion processing on the first image and the second image;

performing Fourier transform on the second image after color inverted to obtain a displacement offset between the first image after color inverted and the second image after color inverted, and reversely moving the second image after color inverted according to the displacement offset to obtain the Fourier transform result image;

constructing respectively a polar coordinate system of the first image after color inverted and a polar coordinate system of the Fourier transform result image, and determining a displacement between the first image after color inverted and the Fourier transform result image according to polar coordinates of pixel points of the first image after color inverted and polar coordinates of pixel points of the Fourier transform result image;

determining an affine transformation parameter according to the displacement, and performing affine transformation on the second image based on the affine transformation parameter to obtain the transformed image.

20. The computer readable storage medium according to claim 17, wherein the computer program further causes the computer to execute the following method:

calculating a mask of the character area in the transformed image;

setting the character area of the first image to a color indicated by a background color according to the mask, and obtaining a size of an area of the first image whose color is not the background color; and determining that the character in the image to be inspected has a stain or character content error when the size of the area of the first image whose color is not the background color is greater than a preset threshold.

* * * * *